United States Patent
Zakharenkov et al.

(10) Patent No.: US 6,574,402 B2
(45) Date of Patent: Jun. 3, 2003

(54) OPTICAL TIME-DIVISION MULTIPLEXING SYSTEM

(75) Inventors: Yuri A. Zakharenkov, Tracy, CA (US); Gregory S. Maurer, San Ramon, CA (US); James E. Leight, San Ramon, CA (US)

(73) Assignee: Lightica, Inc., San Ramon, CA (US)

( * ) Notice: Subject to any disclaimer, the term of this patent is extended or adjusted under 35 U.S.C. 154(b) by 0 days.

(21) Appl. No.: 09/975,569

(22) Filed: Oct. 10, 2001

(65) Prior Publication Data

US 2003/0068148 A1 Apr. 10, 2003

(51) Int. Cl.[7] ................................................. G02F 1/365
(52) U.S. Cl. ........................................... 385/122; 385/5
(58) Field of Search ...................................... 385/5, 122

(56) References Cited

U.S. PATENT DOCUMENTS

| | | | | |
|---|---|---|---|---|
| 5,557,700 A | * | 9/1996 | Nakamura et al. | 385/122 |
| 6,075,640 A | * | 6/2000 | Nelson | 359/239 |
| 2002/0041721 A1 | * | 4/2002 | Nakazawa | 385/7 |
| 2002/0126946 A1 | * | 9/2002 | Prucnal et al. | 385/16 |

* cited by examiner

Primary Examiner—John D. Lee
Assistant Examiner—Tina M Lin
(74) Attorney, Agent, or Firm—Merchant & Gould P.C.

(57) ABSTRACT

An optical device for serializing data signals in a plurality of parallel channels is disclosed, including: (a) a plurality of waveguides adapted to conduct light signals of a predetermined wavelength; and (b) a nonlinear optical element having a refractive index and defining an optical path thereon adapted and configured to conduct a control light pulse along the optical path, wherein a portion of each of the plurality of waveguides is adjacent to or in contact with the nonlinear optical element at a different portion along the optical path; wherein the refractive index along the optical path is substantially altered where the control pulse is located such that the relative phase of the light signals of the predetermined wavelength is altered only where the signal is substantially coincident with the control pulse. The refractive index along the optical path in the nonlinear optical element is such that the light signals of the predetermined frequency in any one of the waveguides substantially cannot propagate past the point where the waveguide is adjacent to or in contact with the nonlinear optical element when the control pulse is not adjacent the point, and can substantially freely propagate through the point when the control pulse is adjacent the point. The device further includes a single source of the control pulse, wherein the light path is adapted and configured to conduct the control pulse to all portions of the light path where the waveguides are adjacent to or in contact with the nonlinear optical element, whereby a single control pulse can alter the relative phases of all light signals substantially coincident with the control pulse propagating along the optical path.

14 Claims, 12 Drawing Sheets

— SERIALIZER

— DESERIALIZER

OPTICAL TIME-DIVISION MULTIPLEXING SYSTEM

FIELD OF THE INVENTION

The present invention relates generally to ultra-high-speed fiber-optical communication systems and more particularly to optical time-division multiplexing (OTDM) systems and methods that provide improved performance and/or economy over conventional dense wavelength division multiplexing (DWDM) and other OTDM systems.

BACKGROUND OF THE INVENTION

Modem computing and data communication applications are making ever-increasing demands on the communication systems to handle higher data rates per communication channel, as well as bandwidth. The increased demands are due not only to increased number of users and applications, but also to the increasing complexity of the applications. For example, large-scale distributed computing projects may involve multiple networked supercomputers exchanging data with other over the network at ultra-high speeds. Other examples include graphics-intensive network applications such as complex 3-D designer projects and interactive video applications involving multiple users located at large distances from each other. Another example is the use of storage area networks, in which large quantities of data are exchanged between users throughout a wide geographical area and large databases. Such networks may be used, for example, by commercial package delivery services that constantly track the delivery status nationwide or worldwide, credit card processing centers, large chain retail networks, etc. Many of these applications require network data transmission rates of 100 gigabits per second (Gb/s) or higher.

Optical fibers have been widely used as high-speed data paths. In a typical fiber optical communication system, optical signals are transmitted within ranges of wavelengths, or wavelength windows, that avoid unacceptably high optical absorption. For example, the International Telecommunications Union ("ITU") specifies six spectral bands for fiber optical communications: the O-Band (1,260 nm to 1,310 nm), the E-Band (1,360 nm to 1,460 nm), the S-Band (1,460 nm to 1,530 nm), the C-Band (1,530 nm to 1,565 nm), the L-Band (1,565 nm to 1,625 nm), and the U-Band (1,625 nm to 1,675). The C-band, for example, has range of useable wavelengths corresponding to a bandwidth of about 4.4 terahertz (THz) centered around wavelength of 1550 nm.

To maximize the utility of the signal-carrying capacity of the optical fiber, it is desirable to transmit signals having a combined wavelength content that occupies as much of the wavelength window as possible. FIG. 1 schematically shows a basic transmitter DWDM scheme for achieving this goal. Data from each data channel (one of Data_1 through Data_N), delivered as electrical pulses, are used to modulate in electro-optical modulators ($M_1$ through $M_N$) emission of N different continuous-wave (CW) lasers with wavelengths from $\lambda_1$ to $\lambda_N$. The modulated signals are then multiplexed by a wavelength multiplexer (MUX) to produce a combined signal.

FIG. 2 schematically shows the spectrum (intensity I as a function of wavelength $\lambda$) of the combined signal. Here, each data channel occupies a wavelength band centered at the wavelength permitted by the ITU and has a width that is proportional to the modulation rate of that channel. The WDM channels ($\lambda$'s) must be sufficiently far apart to avoid crosstalk, or aliasing, between channels. Thus, there is some wasted wavelength space when wavelength multiplexing is used. Given the limited communication wavelength window (e.g., C-band, 35 nm), the higher the modulation rate of each channel, the fewer channels (with each channel containing more information) and the smaller total wasted space in guard bands between the channels.

Modulators in fiber-optical systems can be electronic or optical. In an electronic modulator, incoming optical data signals must be first converted to electrical signals. The electrical modulating signals are then sent to an electro-optic device to modulate CW lasers. The current modulation rate limit for electronic modulation is relatively low (e.g., Commercially available transmitters have a 10 Gb/s limit, with 40 Gb/s transmitters currently in prototype phase).

In direct optical modulation, non-linear optical materials are used. In a non-linear optical material, the refractive index of the material changes significantly with the intensity of the light passing through the material. When a high-intensity clock pulse propagates through such a material, the refractive index changes locally and affects the optical path of the data pulses, thereby modulating the data pulse. For example, in a modulator employing the principles of the well-known Mach-Zehnder interferometer, the data stream is split into two branches, at least one of which passes through a non-linear optical material. Clock pulses can be used to alter the refractive index of the material, thereby changing the phase of the data pulse in this branch relative to the other. The two branches are then recombined and will constructively or destructively interfere with each other, depending on the relative phase between the two, thereby forming modulated signals.

Optical modulators offer the possibility of much higher modulation rates than is possible with electro-optic modulators. Achieving higher bit rates can reduce or eliminate the need for expensive wavelength stabilized laser transmitters and DWDM multiplexers. Although they have been demonstrated in laboratory experiments, optical nonlinear modulators have so far not been shown to be cost effective solutions. As a result, existing fiber-optical communication systems that employ optical modulators in each separate channel tend to only be long-haul systems, where the expenses are more easily justified. There is, however, a long-felt need to reduce costs for all-optical systems in order to provide a cost-effective option for short-haul applications as well.

This invention is directed at solving one or more of the afore-mentioned problems.

SUMMARY OF THE INVENTION

Generally, the invention provides a device, system and method for economical implementation of OTDM systems. Instead of using a modulator for each data stream as in conventional systems, a device constructed in accordance with the principles of the invention employs an optical modulator to gate one or more data streams. A single stream of clock pulses, without splitting, is used to successively gate the one or more data streams. Thus, devices constructed in accordance with the invention are capable of achieving the same or better performance levels as conventional OTDM systems with fewer components. Because the clock pulses are not split to feed multiple modulators, relatively inexpensive, off-the-shelf, low power sources can be used.

According to one aspect of the invention, an optical device for serializing data signals in a plurality of channels includes: (a) one or more waveguides adapted to conduct light signals of a predetermined wavelength; and (b) a nonlinear optical element having a refractive index and defining an optical path therein adapted and configured to conduct a control light pulse along the optical path, wherein a portion of each of the plurality of waveguides is adjacent to or in contact with the nonlinear optical element at a different portion along the optical path; wherein the refractive index along the optical path is substantially altered where the control pulse is located such that the relative phase of the light signals of the predetermined wavelength is altered only where the signal is substantially coincident with the control pulse.

The refractive index along the optical path in the nonlinear optical element can be such that the light signals of the predetermined frequency in any one of the waveguides substantially cannot propagate past the point where the waveguide is adjacent to or in contact with the nonlinear optical element when the control pulse is not adjacent the point, and can substantially freely propagate through the point when the control pulse is adjacent the point.

The device constructed according to the invention can further include a single source for the control pulse, wherein the light path is adapted and configured to conduct the control pulse to all portions of the light path where the waveguides are adjacent to or in contact with the nonlinear optical element, whereby a single control pulse can alter the relative phases of all light signals substantially coincident with the control pulse propagating along the optical path.

The device of the invention can also further include an optical combiner adapted to spatially combine a plurality of optical beams into one beam, the combiner having a plurality of input ports operatively connected to the waveguides and an output port.

According to the invention, a method of serializing optical signals includes: (a) providing a plurality of optical signals in their corresponding waveguides; and (b) using a single control pulse without splitting the pulse, modulate the optical signals. The modulating step can include successively modulating the plurality of the optical signals. The successive modulation can be accomplished by propagating the control pulse in a non-linear optical media sequentially to points. The control pulse can be of same rate as the data pulse rate or can be an integer times of the data pulse rate for over-sampling.

The timing of the control pulses can be controlled such that they gate through the data pulses time wise substantially at the mid-point of the data pulses.

BRIEF DESCRIPTION OF THE DRAWINGS

Other objects and advantages of the invention will become apparent upon reading the following detailed description and upon reference to the drawings in which:

FIG. 9b schematically shows the spectra of the input data, clock and converted data for a serializer shown in FIG. 9a;

Figure 1:
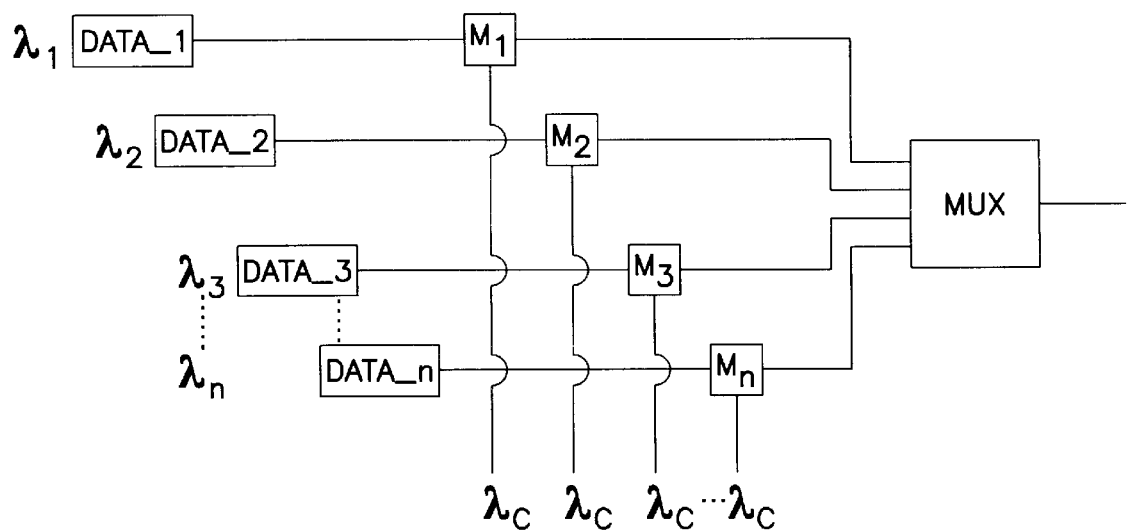
FIG. 1 shows schematically the transmission end of a typical wavelength division multiplexing (WDM) communication system.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Generally, an OTDM system constructed in accordance with the principles of the present invention includes, on the transmission side, an optical clock source; a serializer that includes a plurality of input terminals operatively coupled to sources of optical data signals; a modulator having a plurality of waveguides connected to the plurality of input terminals and a non-linear optical element (NLE) connected to the clock source and having a plurality of outputs; and an optical combiner connected to the outputs of the modulator and a combiner output. The NLE defines a path for the propagation of the clock pulse launched from the clock source.

The system also includes, at the receiving end, a deserializer, which may be identical to the serializer but optically in reverse order from the serializer. That is, the combiner output in the serializer is the input to the combiner, which functions as a splitter, and the plurality of inputs to the serializer are outputs for the deserializer.

The system can also include an optical fiber between the serializer and deserializer. It will be appreciated, however, that the optical fiber may be installed or previously placed.

In general, at the transmission end, data signals from a plurality of optical fibers are launched into the waveguides of the modulator. A train of clock pulses is launched into the NLE and travels from one end of the element to the other. One or more optical property is locally altered by the clock pulses such that the data signals are modulated by the clock pulses. For example, without the clock pulse near a NLE, the special distribution of the refractive index ($n_1$, $n_2$) of the element (e.g., a periodic structure) is such that no signal passes through the modulator. As a clock pulse reaches the vicinity of a NLE, the spatial distribution of the refractive index of the element (e.g., uniform for nonlinear refractive index change) is such that the data will pass for the duration of the excitation by the clock pulse Thus, the data signals are gated by the clock pulse. The output of the modulator is then a plurality of gated (or modulated) data signals shifted from each other in time. The gated signals are then combined by the combiner, the output of which is a train of time-division multiplexed pulses with a pulse rate on average N times the clock rate, where N is the number of input data streams.

At the receiving end, the process is reversed. The splitter sends time-division multiplexed signals into a plurality of N waveguides. The pulses in a NLE cannot pass through until a clock pulse reaches the vicinity of the NLE. A different serial data pulse, one of N channels, in each of N waveguides simultaneously reaches NLE due to the certain relative time delay, introduced by waveguides. The result is that the information from different channels is separated out using single time gating device.

In another embodiment, on the transmission side, the data beams are modulated in turn by the clock pulses in modulators employing cross phase modulation or four wave mixing. The modulated beams have wavelengths that are dependent upon the wavelengths of the data signals and clock pulses. The modulated signals can then be selected by spectral filtering. On the receiving side, the modulated signals are mixed again with clock pulses to reproduce the data signals, which can be selected by spectral filtering, and sequentially launched into separate output channels. The modulation and demodulation of an individual channel by cross phase modulation or for wave mixing are known. See, for example, U.S. Pat. No. 6,049,642, to Nakamura et al.

OTDM System

Figure 3:
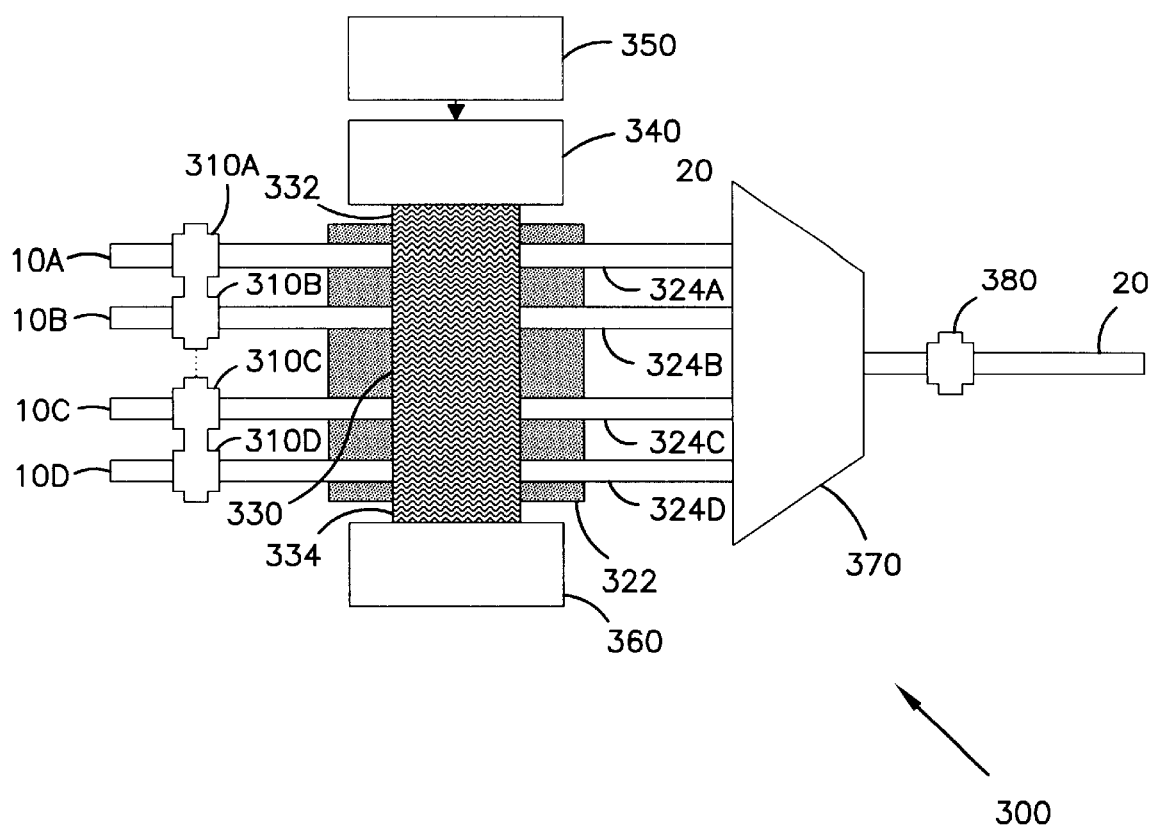
FIG. 3 schematically illustrates the transmission, or serializer, side of an OTDM according one aspect of the invention.

Referring to FIG. 3, the transmitting end 300 of the OTDM system according to one aspect of the invention includes fiber connectors 310a–d, which couple incoming fibers 10a–d to waveguides 324a–d, respectively, in a waveguide device 320. Although only four channels are shown, any number of desired channels can be included. The waveguides 324a–d are supported on a substrate. An NLE 330 is embedded in the waveguide device 320 and is generally transverse to the waveguides 324a–d, which are generally parallel among themselves. The NLE 330 is connected to a laser clock source 340 at one end 332 of the NLE 330, which can be energized by a clock laser drive 350, and a clock pulse terminator 360 at the other end 334. The clock pulse terminator 360 can be any suitable optical terminator, such as an absorber. The waveguides 324a–d are connected to an optical combiner 370. The output of the combiner is connected to the transmission optical fiber 20 via a fiber connector 380.

The NLE devices 330 according to the invention include materials with large Kerr nonlinearities in order to obtain a low-intensity threshold for limiting action. Recently, highly nonlinear materials with low absorption coefficients have been reported with nonlinear refractive indices, $n_2$, as high as $1 \cdot 10^{-1}$ cm$^2$/W with response times of picoseconds or better. See, for example, R. Rangel-Rojo, S. Yamada, S. Matsuda, and H. D. Yankelevich, "Large near-resonance third-order nonlinearity in an azobenzene-functionalized polymer film," *Appl. Phys. Lett.*, vol. 72, no. 9, pp. 1021–1023, March 1998.; and W. Van Stryland and M. Shei-Bahae, *"Z-Scan, " Characterization Technique and Tabulations for Organic Nonlinear Optical Materials*, M. G. Kuzyk and C. W. Dirk, Eds. New York: Marcel Dekker, 1998, pp.655–692.

Figure 7:
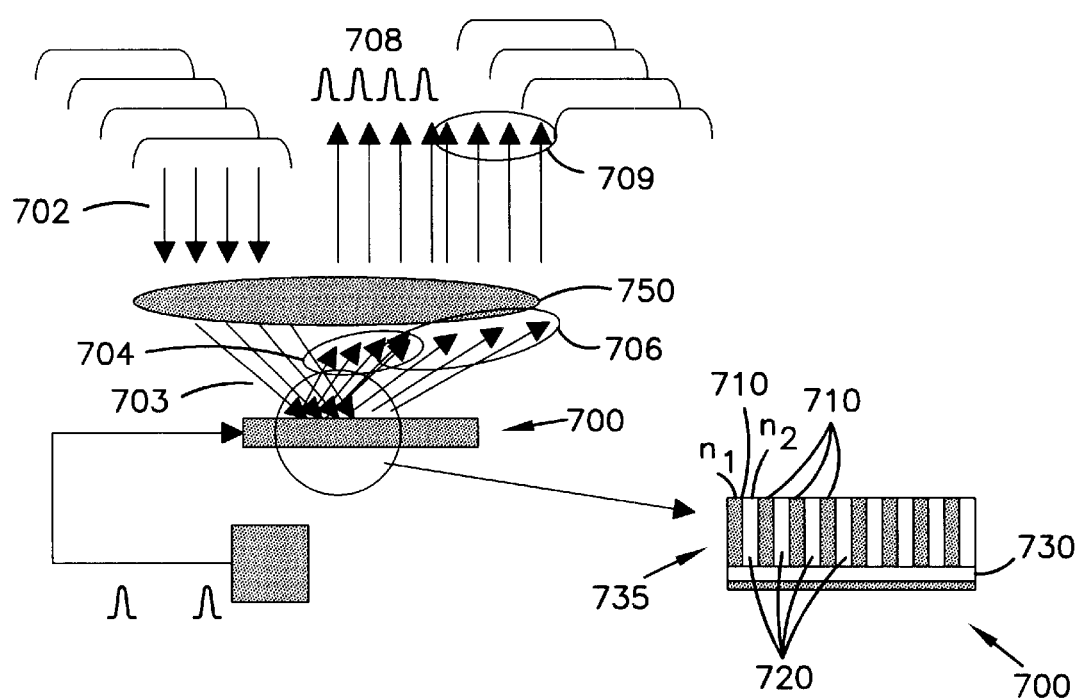
FIG. 7 schematically shows, a diffraction grating with periodic variation in refractive index in the non-linear optical element 330 in FIG. 3 or 430 in FIG. 4 according to one aspect of the invention.

The NLE 330 can be made of any suitable optically non-linear material, such as chalcogenide glass (See, e.g., U.S. Pat. No. 6,208,792, to Hwang, et al., Mar. 27, 2001), semiconductors on InP substrate, LiNO$_3$, and polymeric materials such as azobenzene-functionalized polymer films. The NLE 330 can be configured in any suitable fashion to cause the light signals in each waveguide (for example 324a) to be blocked or passed under different laser excitation conditions near the waveguide. For example, as schematically shown in FIG. 7, the NLE 330 (FIG. 3) or 700 can include a mirror 730 with an attached nonlinear diffraction grating 735. The non-linear diffraction grating 735 can be fabricated from materials with spatial regions having refractive index which alternate between two values n$_1$ (710) and n$_2$ (720) periodically when the clock pulse is not present. However, the refractive index becomes substantially uniform (i.e., n$_1$ and n$_2$ become substantially the same) upon being irradiated by the clock pulse. By properly choosing the number of alternating layers and periodicity according well-established principles (see, for example, Lukasz Brzozowski and Edward H. Sargent, "All-Optical Analog-to-Digital Converters, Hardlimiter, and Logic Gates", *J. Lightwave Technology*, vol. 19, no. 1, January. 2001), the NLE can be made to diffract the input beams 703 when a clock pulse is absent, but to be substantially transparent so that the incoming beams 703 are reflected by the mirror 730 at a different angle than the diffraction angle. Thus, when the clock pulse is absent, the data beam 702, which may be redirected by a lens 750, is diffracted out of (706) the waveguides 324. When the clock pulse is present, the NLE 735 becomes essentially transparent and the beam 702 (or 703) is reflected (704) at an angle such that (after possibly being redirected again by the lens 750) the beams 708 are aligned with the remainder of the waveguides 324 and further transmitted.

The material of the NLE can be chosen or fabricated according to well known techniques, such as chemical vapor deposition, or pulsed laser deposition, such that in the presence of a clock pulse, the refractive index becomes substantially uniform. Thus, when a clock pulse is present near a NLE, there is no periodic structure imposed on the NLE, and the data signal passes on.

Figure 4:
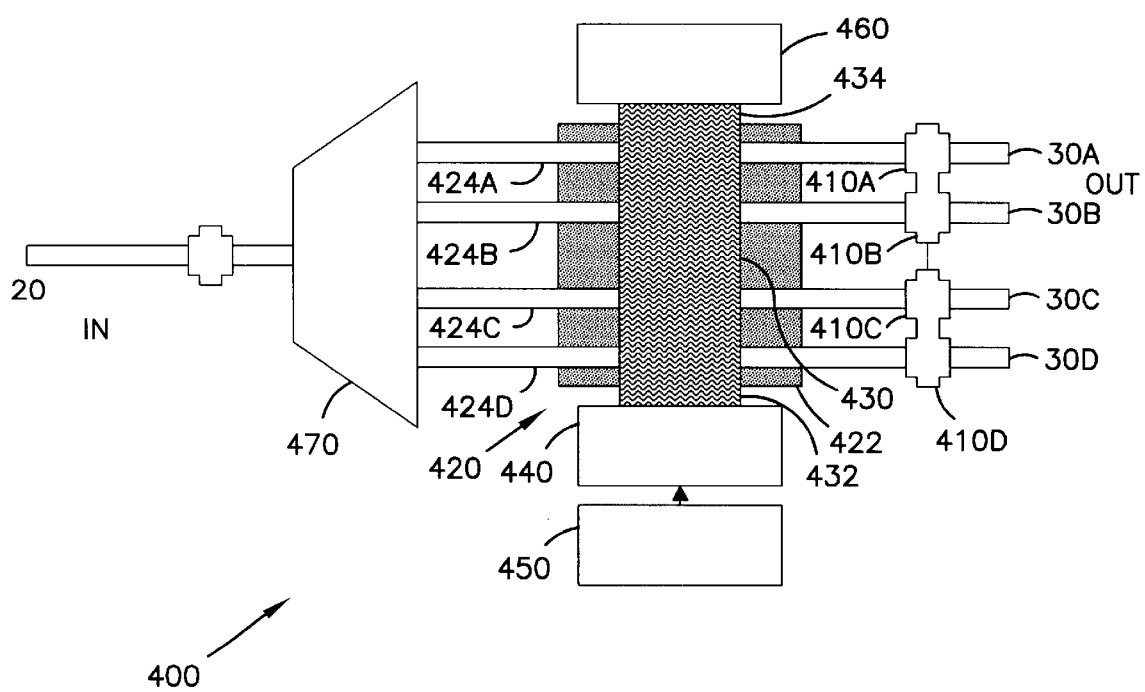
FIG. 4 schematically illustrates the receiving, or de-serializer, side of an OTDM according one aspect of the invention.

Referring to FIG. 4, the receiving end 400 of the OTDM system is identical to the transmission end 300 except that the optical components are in reverse order relative to the direction of data signal propagation. Thus, for example, the element 470 at the receiving end corresponding to the combiner 370 is a splitter. The symmetric correspondences between the other components are readily recognized from FIGS. 3 and 4 and will not be separately described herein in the interest of clarity.

Of course, modulated data signals are carried in an optical fiber 20 between the two ends 300 and 400.

Other components of the device 300 are well known to those skilled in the art. In particular, because the laser pulses from the laser clock source 350 are not split to modulate a plurality of data streams, the source can be a low-power laser source that is easily available commercially. For example, a 10 mW laser can be sufficient for ten or more channels.

Figure 9A:
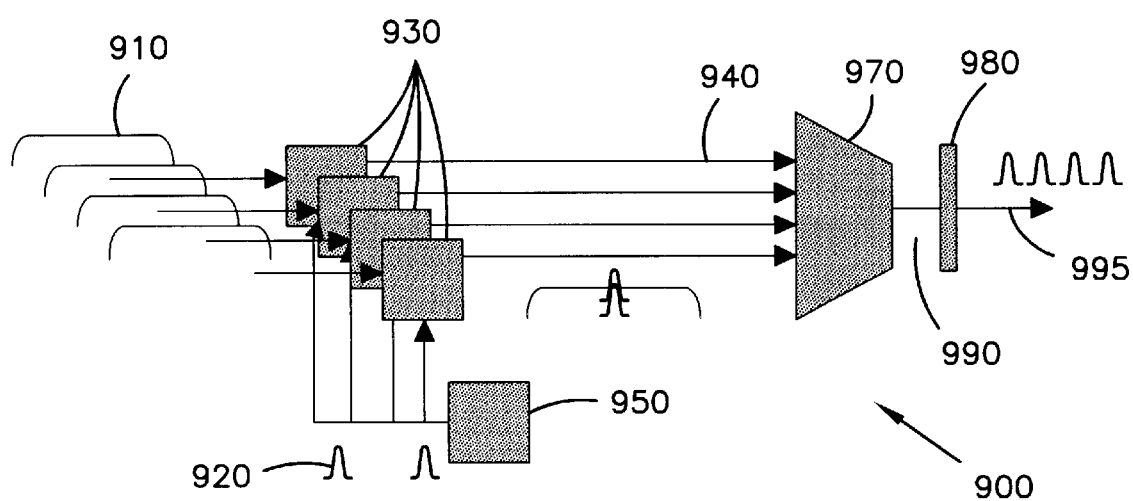
FIG. 9a schematically shows an optical serializer using parametrical wavelength mixing in accordance with another aspect of the invention.
Figure 9B:
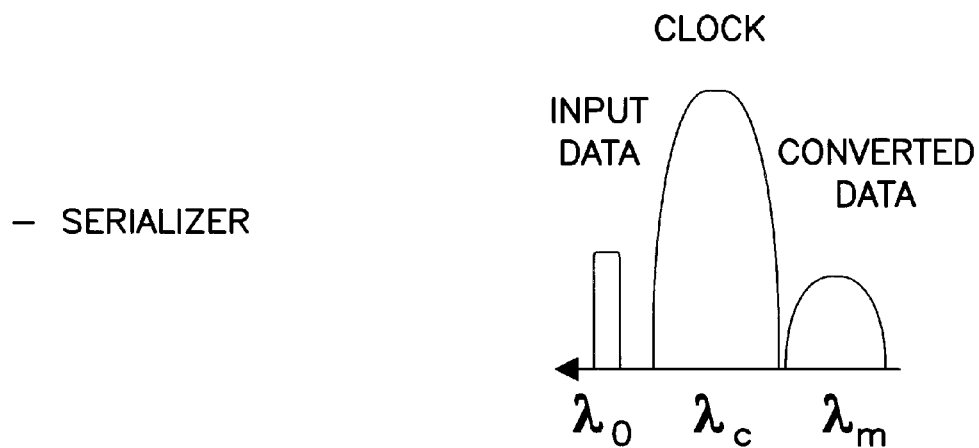

In another embodiment of the invention, the principles of parametrical wavelength mixing can be used to modulate the input data. As schematically shown in FIG. 9a, in a serializer 900 at the transmission end of the network, short laser clock pulses 920 having wavelength $\lambda_C$ travels NLE 930 (the clock pulses being utilized in every subsequent element after passing preceding one) along with long data pulses 910 with wavelength $\lambda_0$. Due to parametric interaction of two pulses in nonlinear element a short pulse with wavelength $\lambda_m$ is produced ($\lambda_m=2*\lambda_c-_0$). The modulated pulses 940 are combined by an optical combiner 970 into a single fiber 990 with appropriate relative time delay. An output optical bandpass filter 980 extracts RZ data stream at wavelength $\lambda_m$.

Figure 10:
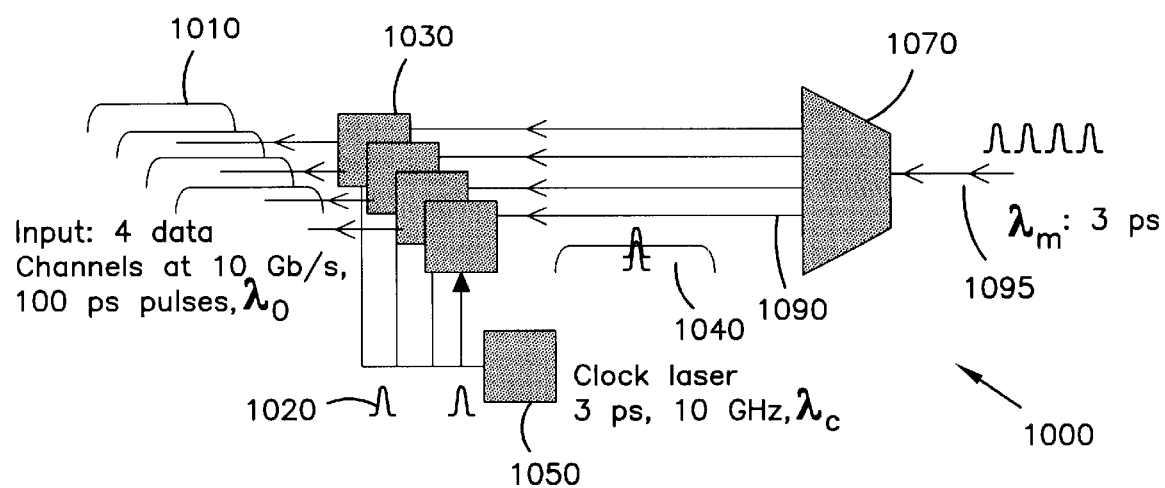
FIG. 10 schematically shows a deserializer in accordance to another aspect of the invention.

At the receiving end of the fiber link, a deserializer is used to extract the original data. A deserializer 1000, schematically shown in FIG. 10, is similar to the serializer 900 but used in reverse order of the serializer. Thus, data pulses 1095 with wavelength $\lambda_m$ are split by the splitter 1070 (combiner in reverse) and then mixed with clock pulses 1020 at $\lambda_C$ in the nonlinear elements 1030 to produce output data streams 1010 of wavelength $\lambda_0$ ($2\lambda_C-\lambda_m=\lambda_0$), which is extracted with appropriate bandpass filter (not shown) and detected by photoreceiver (not shown).

A number of suitable materials can be used for parametric wavelength mixing. For example, an effective material for parametric wavelength mixing is semiconductor optical amplifier (SOA), which has relatively high nonlinear refractive index (up to $10^{-9}$ cm$^2$/W) and can be used as a signal amplifier at the same time.

Figure 9C:
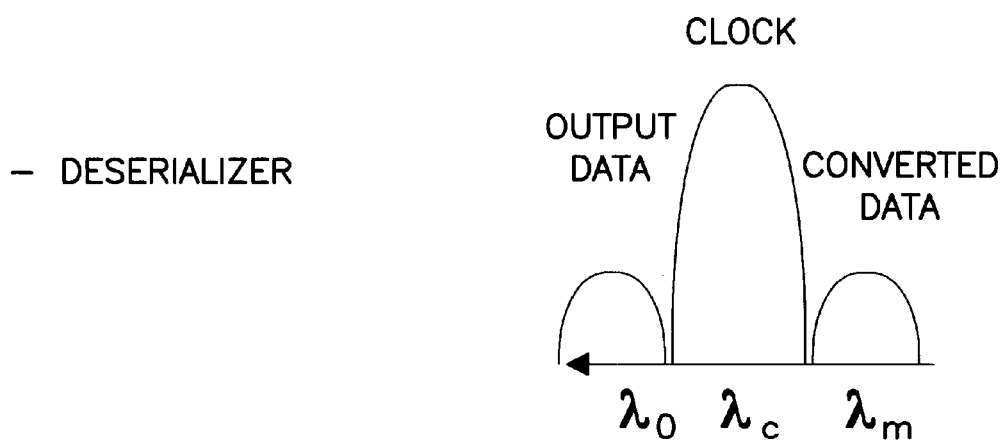
FIG. 9c schematically shows the spectra of the output data, clock and converted data for a deserializer that is the same as the serializer shown in FIG. 9a but with light beams traveling in reverse direction as compared to a serializer.

FIG. 9c shows, respectively, the optical spectra of incoming low-speed data signal, clock pulse and resulting high-speed data signal at the serializer. FIG. 7d shows, respectively, the optical spectra of data signal, coming from the high-speed fiber link, clock pulse and deserializer output data signal.

Operation

Figure 5:
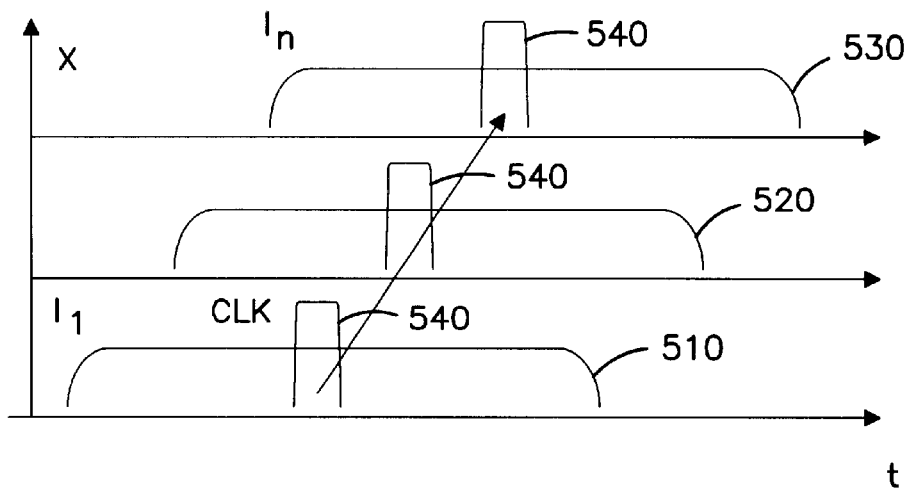
FIG. 5 shows schematically part of the serialization sequence that takes place at the transmission end illustrated in FIG. 3.
Figure 8:
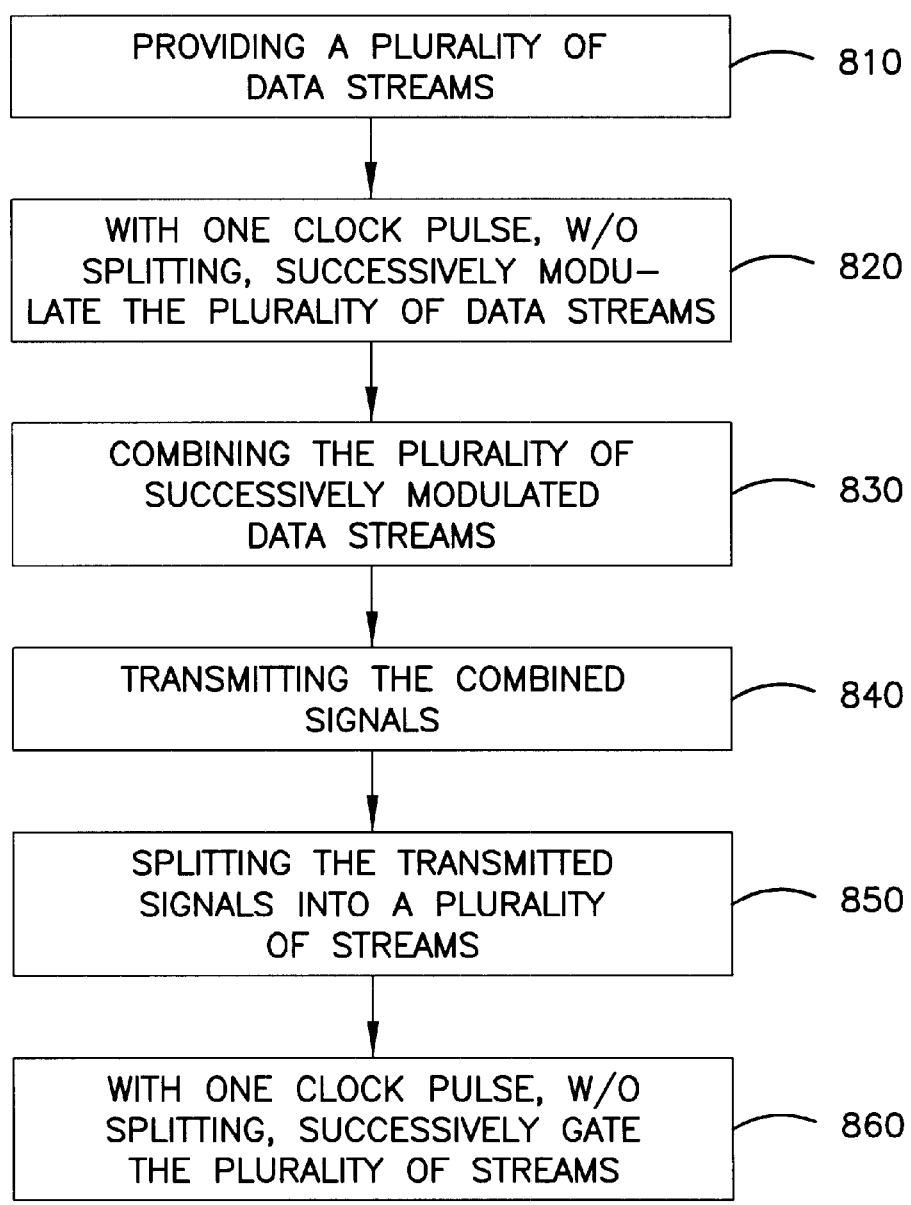
FIG. 8 shows an outline of the method according to one aspect of the invention.

Referring additionally to FIGS. 5 and 8, in operation, the transmission end of 300 of the OTDM system serializes a plurality of parallel data streams in the following manner. First, a plurality of synchronous data streams 510, 520, 530 are provided (810) to the waveguides (for example 324a, b and c, respectively). Typically such data streams are provided in non-return-to-zero (NRZ) format. The signals 510, 520 and 530 are blocked by the modulator in absence of a clock pulse.

Next (820), with a single clock pulse 540 and without splitting it, modulate the plurality of data streams in succession. The clock laser pulse 540 is launched from one end of the non-linear element 340 from one end to the other so that the clock pulse 540 propagates over the waveguides 324a, b, and c in succession. As the clock pulse 540 propagates over each waveguide, the pulse 540 causes the refractive index of the region to change so that the data signal is no longer blocked. After the clock pulse 540 leaves the vicinity of the waveguide, the refractive index pattern returns to the pre-clock-pulse state, and the data stream is once again blocked. The net result is data signals 510, 520 and 530 are successively gated through the modulator by the propagating clock pulse 540. The output of the modulator is a parallel set of modulated, typically return-to-zero (RZ) pulses shifted in time relative to each other. The relative timing between the data streams and between the clock pulse and the data streams can be chosen so that the gated portion of each data signal bit is substantially the middle portion of the data signal bit, as schematically shown in FIG. 5. Many other modulation sequences are possible. For example, the clock rate can be twice or more times that of the data stream rate, so that each data bit is sampled a plurality of times for redundancy to improve reliability.

In the next step (830), the modulated signals are combined by the combiner 380 and launched into the transmission optical fiber 20 and transmitted (840) to the receiving end 400. The serialized signals then contain the interleaved signals from the plurality of parallel channels and has a data rate on average n/m times that of the clock rate, where n is the number data streams modulated, and m is the redundancy.

Figure 6:
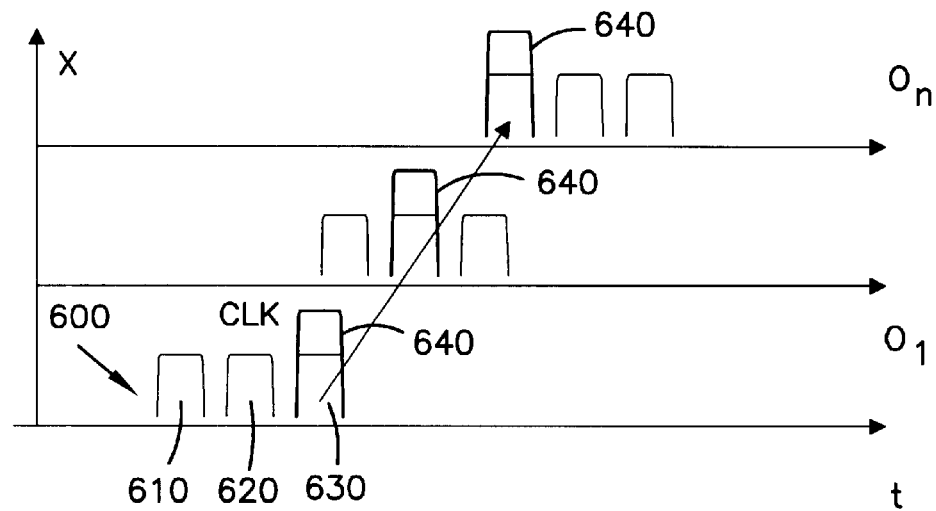
FIG. 6 shows schematically part of the serialization sequence that takes place at the receiving end illustrated in FIG. 4.

Referring additionally to FIG. 6, the operation at the receiving end 400 is similar to that at the transmission end 300 but in reverse order. First (850), the splitter 480 splits the incoming train of signals 610, 620, 630 and simultaneously launches each portion into a waveguide 424a, b, and c.

Next (860), a clock pulse 640, without splitting, is launched across the non-linear optical element 440 to successively select the modulated signals. Similar to the situation at the transmission end 300, the signals in a waveguide are blocked unless a clock pulse passes by the waveguide. The timing of the clock is preferably such that a modulated signal is allowed to pass substantially in its entirely when a clock pulse 640 passes a waveguide. Devices and methods for selecting clock pulses are well known. See, for example, U.S. Pat. No. 5,991,477, to Ishikawa, et al., Nov. 23, 1999. Because the modulated signals are launched into the waveguide simultaneously, but the clock pulse propagates over the waveguide successively, the modulator passes a different modulated signal 610, 620 or 630 in each waveguide. Those signals originated from different optical fibers and are once again separated into different optical fibers 30a, b, and c.

Figure 11:
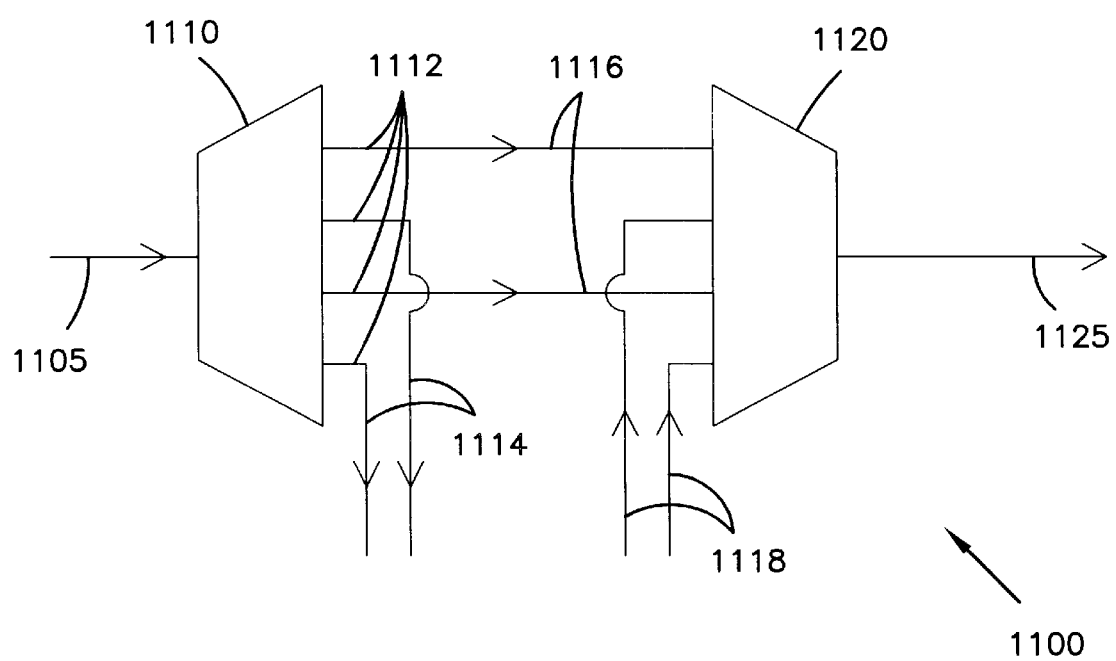
FIG. 11 schematically shows an add/drop module utilizing a pair of deserializer and serializer according to an aspect of the invention.

The invention enables a variety of applications in addition to simple serialization and deserialization. For example, with a pair of deserializer and serializer, an all-optial add/drop module can be realized. As schematically shown in FIG. 11, an add/drop module 1100 can include a back-to-back pair of deserializer 1110 and serializer 1120. A serialized beam 1105 is first deserialized into its component beams 1112 by the deserializer 1110. Certain beams 1114 from the deserialized beams 1112 may be "dropped", or separated out, (by either optical switches (not shown) or other well known means) for local use or otherwise disposed of. The remainder 116 passes through to a serializer 120. Other beams 1118 may be added in the unoccupied channels of the serializer 1120. The passed-through beams 1116 and added beams 1118 are then serialized by the serializer 1120 into a single beam 1125.

Figure 12:
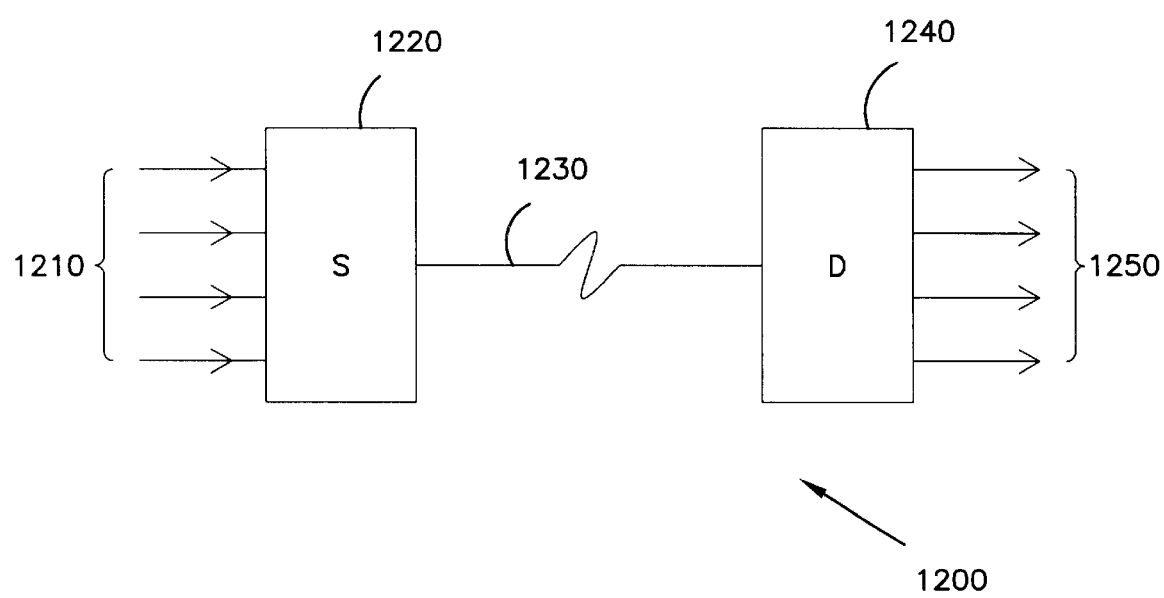
FIG. 12 schematically shows an optical communication system according to an aspect of the invention.

Of course, the devices described above can be used in a variety of optical networks. One 1200 of the simplest of such networks, schematically illustrated in FIG. 12, includes a serializer 1220 and a deserializer 1240 linked by an optical fiber 1230. Data pulse from a plurality of channels 1210 are serialized by the serializer 1220 as described above and transmitted through the optical fiber 1230 to the deserializer 1240. The data from the different channels 1210 are separated out by the deserializer 1240 and launched into their corresponding channels 1250.

Conclusion

The OTDM communication system of the invention has several advantages over the traditional WDM and OTDM systems previously published. Using data sources of a single wavelength reduces or eliminates the need to laser sources tuned to different wavelengths as in the WDM systems. Using a single laser clock source for a plurality of data channels without splitting increases the power efficiency of the clock. Since optical modulators are driven by clock pulses instead of data signals, there is no data pattern dependence in amplitude of the resulting data stream. High modulation rate results in reduced or eliminated number of wavelength multiplexers, which are complex and expensive. Reduced number of optical modulators increases the economy and reliability of the system.

Figure 2A:
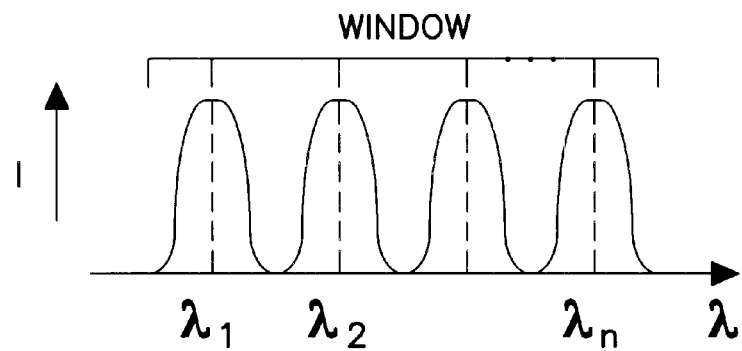
FIG. 2a shows schematically the spectrum of the multiplexed beam out of the WDM multiplexer in FIG. 1.
Figure 2B:
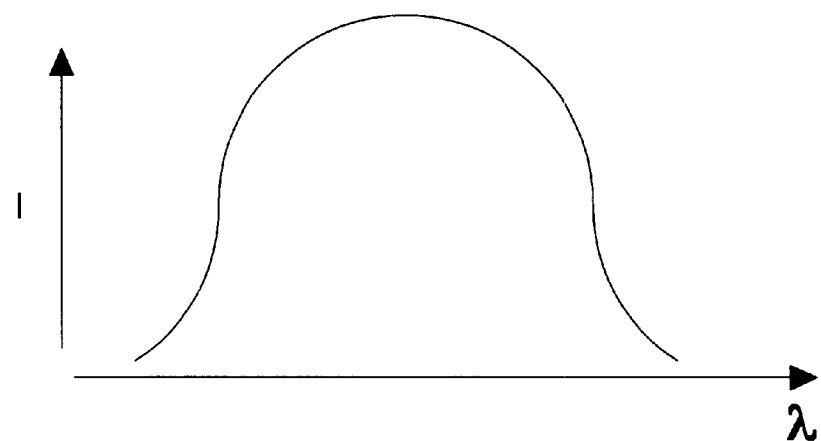
FIG. 2b shows schematically the spectrum of the serialized beam out of a serializer according to one aspect of the invention.

As a result of the ultra-high modulation rates attainable with the invention, a single band of high bandwidth (e.g. 40 Gb/s, 100 Gb/s or higher) can be used in place of several bands of lower modulation rates (see FIG. 2b and compare with FIG. 2a), the traditionally wasted inter-band wavelength spacing is reduced or eliminated. The efficiency of utilization of spectral window is thus greatly improved.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. An optical device, comprising:
   (a) a plurality of waveguides adapted to conduct light signals of a predetermined wavelength;
   (b) a nonlinear optical element having a refractive index and defining an optical path therein adapted and configured to conduct a control light pulse along the optical path, wherein a portion of each of the plurality of waveguides is adjacent to or in contact with the nonlinear optical element at a different portion along the optical path;
   wherein the material for the nonlinear optical element is chosen such that its refractive index along the optical path is substantially altered where the control pulse is located such that the relative phase of the light signals of the predetermined wavelength is altered only where the signal is substantially coincident with the control pulse.

2. The device of claim 1, wherein the refractive index along the optical path is such that the light signals of the predetermined frequency in any one of the waveguides substantially cannot propagate past the point where the waveguide is adjacent to or in contact with the nonlinear optical element when the control pulse is not adjacent the point, and can substantially freely propagate through the point when the control pulse is adjacent the point.

3. The device of claim 1, further comprising a single source of the control pulse, wherein the light path is adapted and configured to conduct the control pulse to all portions of the light path where the waveguides are adjacent to or in contact with the nonlinear optical element, whereby a single control pulse can alter the relative phases of all light signals substantially coincident with the control pulse propagating along the optical path.

4. The device of claim 1, further comprising an optical combiner adapted to spatially combine a plurality of optical beams into one beam, the combiner having a plurality of input ports operatively connected to the plurality of waveguides and an output port.

5. A method of serializing optical light signals, the method comprising:
   a. providing a plurality of optical light signals in a plurality of corresponding waveguides;
   b. using a single control pulse without splitting the pulse, modulate the plurality of the optical signals.

6. The method of claim 5, wherein step (b) comprises successively modulating the plurality of the optical signals.

7. The method of claim 6, wherein the step of successively modulating comprises propagating the control pulse in a non-linear optical media sequentially to points.

8. The method of claim 5, wherein step (a) comprises providing synchronized pulses of a first predetermined pulse rate, and wherein step (b) comprises using a control pulse of a second predetermined pulse rate, wherein the second pulse rate is an integer times of the first pulse rate.

9. The method of claim 8, wherein the second pulse rate is the same as the first pulse rate, wherein the synchronized pulses have a pulse width with a mid-point and the step of using the control pulse comprises timing the control pulse such that it propagates to the points adjacent to or in contact with the plurality of waveguides when the mid-points of synchronized pulses are substantially positioned at their respective adjacent or contact points.

10. The method of claim 8, wherein the control pulse rate is two or more time that of the synchronized light signals, whereby each synchronized light pulse is modulated twice or more by the control pulse.

11. An optical device, comprising:
    (a) a plurality of waveguides adapted to conduct light signals of a predetermined wavelength;
    (b) a nonlinear optical element defining an optical path therein adapted and configured to conduct a control light pulse along the optical path, wherein a portion of each of the plurality of waveguides is adjacent to or in contact with the nonlinear optical element at a different portion along the optical path;
    wherein the nonlinear optical element is selected such that at least one optical property of the nonlinear optical element along the optical path is substantially altered where the control pulse is located such that the relative phase of the light signals of the predetermined wavelength is altered only where the signal is substantially coincident with the control pulse.

12. The optical device of claim 11, further comprising an optical combiner adapted to spatially combine a plurality of optical beams into one beam, the combiner having a plurality of input ports operatively connected to the plurality of waveguides and an output port.

13. An optical communication system, comprising:
    (a) a first optical device of claim 12;
    (b) a second optical device of claim 12;
    (c) an optical fiber having a first and second ends, wherein the optical fiber is connected at one end to the output port of the combiner of the first optical device, and at the other end to the output port of the combiner of the second optical device.

14. An optical communication system, comprising:
    (a) a first optical device of claim 4;
    (b) a second optical device of claim 4;
    (c) an optical fiber having a first and second ends, wherein the optical fiber is connected at one end to the output port of the combiner of the first optical device, and at the other end to the output port of the combiner of the second optical device.

* * * * *